United States Patent
Rune

(10) Patent No.: US 7,590,732 B2
(45) Date of Patent: *Sep. 15, 2009

(54) ENHANCEMENT OF AAA ROUTING ORIGINATED FROM A LOCAL ACCESS NETWORK INVOLVING INTERMEDIARY NETWORK PREFERENCES

(75) Inventor: Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1128 days.

This patent is subject to a terminal disclaimer.

(21) Appl. No.: 10/960,783

(22) Filed: Oct. 8, 2004

(65) Prior Publication Data

US 2006/0077986 A1  Apr. 13, 2006

(51) Int. Cl.
*G06F 13/00* (2006.01)

(52) U.S. Cl. .................. 709/225; 709/229; 709/238
(58) Field of Classification Search ............... 709/217, 709/219, 223, 225, 227, 228, 229, 238
See application file for complete search history.

(56) References Cited

U.S. PATENT DOCUMENTS

| | | | |
|---|---|---|---|
| 5,570,084 A | 10/1996 | Ritter et al. | |
| 5,862,480 A | 1/1999 | Wild et al. | |
| 6,434,134 B1 | 8/2002 | La Porta et al. | |
| 6,578,085 B1 | 6/2003 | Khalil et al. | |
| 6,636,498 B1 | 10/2003 | Leung | |
| 6,879,584 B2 | 4/2005 | Thro et al. | |
| 6,895,434 B1 | 5/2005 | Chandrupatla et al. | |
| 6,904,055 B2 | 6/2005 | Pichna et al. | |
| 6,917,605 B2 | 7/2005 | Kakemizu et al. | |
| 6,922,404 B1 | 7/2005 | Narayanan et al. | |
| 7,068,640 B2 | 6/2006 | Kakemizu et al. | |
| 7,080,151 B1 | 7/2006 | Borella et al. | |
| 7,151,931 B2 | 12/2006 | Tsao et al. | |
| 7,164,912 B2 | 1/2007 | Buckley et al. | |
| 7,167,705 B2 | 1/2007 | Maes | |
| 7,168,090 B2 | 1/2007 | Leung | |
| 2001/0049790 A1 | 12/2001 | Faccin et al. | |
| 2002/0040390 A1 | 4/2002 | Sullivan et al. | |
| 2002/0068565 A1 | 6/2002 | Purnadi et al. | |

(Continued)

FOREIGN PATENT DOCUMENTS

EP  1 376 973  1/2004

(Continued)

OTHER PUBLICATIONS

3 GPP TS 33.234 Vo. 6.0, Wireless Local Area Network (WLAN) Interworking Security (Release 6), Oct. 10, 2003.

(Continued)

*Primary Examiner*—Viet Vu
(74) *Attorney, Agent, or Firm*—Nixon & Vanderhye P.C.

(57) ABSTRACT

Enhanced routing of an authentication, authorization, or accounting-related (AAA) message between a local access network associated with a roaming mobile terminal and a home service network is described. A list of one or more intermediary service networks preferred for possible use in routing an AAA message between the mobile terminal and the home service network is generated or retrieved and stored. When an AAA message is detected, the list is included with the AAA message. The list is then used in routing the AAA message.

21 Claims, 7 Drawing Sheets

U.S. PATENT DOCUMENTS

| | | |
|---|---|---|
| 2002/0087674 A1 | 7/2002 | Guilford et al. |
| 2002/0122394 A1 | 9/2002 | Whitmore et al. |
| 2002/0197991 A1 | 12/2002 | Anvekar et al. |
| 2003/0119481 A1 | 6/2003 | Haverinen et al. |
| 2003/0176188 A1 | 9/2003 | O'Neill |
| 2003/0177267 A1 | 9/2003 | Orava et al. |
| 2003/0233572 A1* | 12/2003 | Van Ackere et al. ......... 713/200 |
| 2004/0005892 A1 | 1/2004 | Mayer et al. |
| 2004/0037260 A1 | 2/2004 | Kakemizu et al. |
| 2004/0039827 A1 | 2/2004 | Thomas et al. |
| 2004/0066756 A1 | 4/2004 | Ahmavaara et al. |
| 2004/0068571 A1 | 4/2004 | Ahmavaara |
| 2004/0073786 A1 | 4/2004 | O'Neill et al. |
| 2004/0106393 A1 | 6/2004 | Chowdhury et al. |
| 2004/0141488 A1 | 7/2004 | Kim et al. |
| 2004/0142658 A1 | 7/2004 | McKenna et al. |
| 2004/0153555 A1* | 8/2004 | Haverinen et al. .......... 709/229 |
| 2004/0192306 A1 | 9/2004 | Elkarat et al. |
| 2004/0228347 A1 | 11/2004 | Hurtta et al. |
| 2004/0235476 A1 | 11/2004 | Martlew |
| 2004/0249915 A1 | 12/2004 | Russell |
| 2005/0002407 A1 | 1/2005 | Shaheen et al. |
| 2005/0025091 A1 | 2/2005 | Patel et al. |
| 2005/0037755 A1 | 2/2005 | Hind et al. |
| 2005/0041650 A1 | 2/2005 | O'Neill |
| 2005/0075129 A1 | 4/2005 | Kuchibhotla et al. |
| 2005/0079869 A1 | 4/2005 | Khalil et al. |
| 2005/0148299 A1 | 7/2005 | Buckley |
| 2005/0153684 A1 | 7/2005 | Rodrigo |
| 2005/0174945 A1 | 8/2005 | Carrion-Rodrigo |
| 2005/0181788 A1 | 8/2005 | Muhonen |
| 2005/0193150 A1 | 9/2005 | Buckley et al. |
| 2005/0198294 A1 | 9/2005 | Chandrupatla et al. |
| 2005/0272466 A1 | 12/2005 | Haverinen et al. |
| 2005/0276229 A1 | 12/2005 | Torabi |
| 2006/0045249 A1 | 3/2006 | Li et al. |
| 2006/0111107 A1 | 5/2006 | Zhang |
| 2006/0153135 A1 | 7/2006 | Ascolese et al. |
| 2006/0166699 A1 | 7/2006 | Aghvami et al. |
| 2006/0185013 A1 | 8/2006 | Oyama et al. |
| 2006/0187892 A1 | 8/2006 | Zhang |
| 2006/0212700 A1 | 9/2006 | Zhang |
| 2006/0251049 A1 | 11/2006 | Grimminger et al. |
| 2007/0036120 A1 | 2/2007 | Zhang et al. |

FOREIGN PATENT DOCUMENTS

| | | |
|---|---|---|
| WO | WO 03/037023 | 5/2003 |
| WO | 2004/017564 | 2/2004 |
| WO | 2004/064442 | 7/2004 |

OTHER PUBLICATIONS

B. Aboba, M. Beadles, J. Arkko, and P. Eronen; "The Network Access Identifier;" Sep. 30, 2004.

Vollbrecht et al.; "AAA Authorization Framework;" RFC 2904; IETF, Aug. 2000.

International Search Report and Written Opinion of the International Searching Authority mailed Dec. 27, 2005 in corresponding Application PCT/SE2005/001346.

Related U.S. Appl. No. 10/960,782, filed Oct. 8, 2004; Inventor: Rune.

Related U.S. Appl. No. 10/960,781, filed Oct. 8, 2004; Inventor: Rune.

Related U.S. Appl. No. 10/960,780, filed Oct. 8, 2004; Inventor: Rune.

* cited by examiner

ENHANCEMENT OF AAA ROUTING ORIGINATED FROM A LOCAL ACCESS NETWORK INVOLVING INTERMEDIARY NETWORK PREFERENCES

CROSS-REFERENCES TO RELATED APPLICATIONS

This application is related to commonly-assigned application Ser. No. 10/960,782, entitled, "Home Network-Assisted Selection Of Intermediary Network For A Roaming Mobile Terminal", commonly-assigned application Ser. No. 10/960,780, entitled, "Terminal-Assisted Selection Of Intermediary Network For A Roaming Mobile Terminal", and commonly-assigned application Ser. No. 10/960,781, now U.S. Pat. No. 7,298,725, entitled, "Enhancement of AAA Routing Initiated from a Home Service Network Involving Intermediary Network Preferences". The disclosures of these applications are incorporated by reference.

FIELD OF THE INVENTION

The present invention relates to a method and apparatus for establishing a connection via an access network, for example, a wireless local area network (WLAN) communicating with at least one mobile terminal and at least one service access or backbone network that includes a user or mobile terminal authentication and/or authorization process to obtain service. In this regard, the present invention generally relates to interworking a local wireless access network like a WLAN (e.g., based on IEEE 802.11) and public land mobile networks (PLMN) like a UMTS network, and in particular, to roaming and authentication, authorization, and/or accounting (AAA) configurations for such networks. But the invention may be applied to other types of wireless access networks and PLMNs.

BACKGROUND AND SUMMARY

Wireless communications have enjoyed tremendous growth and permit both voice and data communications on a global scale. Indeed, WLAN access networks are currently deployed in many public places, such as airports, hotels, shopping malls, and coffee shops. The WLAN market is currently undergoing a rapid expansion and is being offered as a complementary service for mobile operators. PLMN core network operators, such as GPRS and UMTS network operators, traditionally provide access to mobile packet data services via a wide area GPRS or UMTS network. More recently, those mobile operators have also offered that mobile packet data service directly through a high capacity WLAN access network. Ideally, the mobile operators can provide the packet data service seamlessly between PLMN and WLAN.

There are several important requirements for a mobile operator's complementary WLAN service. First, the WLAN must interwork PLMN, e.g., GPRS and UMTS, established standards. GPRS and/or UMTS are used as non-limiting examples of a PLMN. Specifically, it must be possible to reuse existing GPRS/UMTS authentication mechanisms for WLAN access without degrading the security of the GPRS/UMTS network. Second, roaming must be permitted and specified between wide area cellular radio access and WLAN access networks. Significantly, roaming between different mobile operator WLANs must be supported. A WLAN access network may have a direct or an indirect relationship with one or more service networks.

FIG. 1 illustrates an access configuration where a mobile terminal (MT) 10 initially requests access via a local access network 12. Local access network 12 typically provides "hotspot" wireless connectivity for WLAN clients like the mobile terminal 10 present in its local access coverage area. The local access network 12 is connected to a home service network 14, which provides the ultimate communication service and maintains the direct relationship to the mobile terminal 10. The local access network 12 includes one or more access points 16 (e.g., radio base stations) that provide access to the communication services over the radio or wireless interface. An access router 18 is the data gateway to the Internet and/or an Intranet 13 and to the home service network 14, and it routes data between the mobile terminal 10 and the home service network 14 (although the data path between the access router 18 and the home service network 14 is not shown). The authentication, authorization, and/or accounting (AAA) server 20 is involved in performing authentication and/or authorization of the mobile terminal 10 before access to services is permitted. In this regard, AAA is used as a general term to refer to one or more of authentication, authorization, or accounting and similar operations. The AAA server 20 is also involved in accounting functions once access is permitted. The home AAA server 24 is coupled to a home subscriber server (HSS) 22, which accesses a home subscriber server database (not shown). The home AAA server 24 authenticates and authorizes the mobile terminal using authentication and authorization procedures, which are often performed using the well-known RADIUS or Diameter protocols. An information field in a RADIUS or Diameter message is in this document referred to as an "attribute" or an "AVP", where AVP stands for "Attribute Value Pair".

FIG. 2 illustrates how the local access network may have an indirect (i.e., via an intermediary service network) relationship with a home service network. The local access network has an association with intermediary service networks 30, 34, and 38, and each intermediary service network has its own AAA server 32, 36, and 40, respectively. But only two intermediary service networks 30 and 34 have roaming agreements with the home service network 14. Although not illustrated, there may also be a network (or even multiple networks) between the local access network and the intermediary service networks 30, 34, and 38 in the form of a "roaming consortium".

When a UMTS/WLAN subscriber accesses a WLAN access network, the subscriber's terminal sends a network access identifier (NAI) of the subscriber to the network. An NAI is an identifier with format "name@operator-realm", as described in, "The Network Access Identifier," RFC 2486, January 1999. The NAI is sent using Extensible Authentication Protocol (EAP) over LAN (EAPOL). The transfer of the NAI precedes either an EAP Authentication and Key Agreement (AKA) procedure, as described in J. Arkko et al., "EAP AKA Authentication", Internet-Draft draft-arkko-pppext-eap-aka-10.txt, or an EAP Subscriber Identity Module (SIM) procedure, as described in H. Haverinen et al., "EAP SIM Authentication", Internet-Draft draft-haverinen-pppext-eap-sim-11.txt. The AAA client located in the WLAN AP 16 or the access router 18 (most commonly in the AP) forwards the NAI via an AAA protocol to an AAA server, (e.g, RADIUS, as described in C. Rigney et al., "Remote Authentication Dial In User Service (RADIUS)", RFC 2865, or Diameter, as described in Pat R. Calhoun et al., "Diameter Base Protocol" RFC 3588, Pat R. Calhoun et al., "Diameter Network Access Server Application", Internet-Draft draft-ietf-AAA-diameter-nasreq-12.txt, and Ed P. Eronen, "Diameter Extensible Authentication Protocol (EAP) Application", draft-ietf- AAA-eap-02.txt). This is normally a default AAA server, which may be either the AAA server of the UMTS/WLAN operator or an AAA server of the WLAN network operator (if these operators are not one and the same). In the latter case, the AAA server in the WLAN network forwards the NAI to the AAA server in the subscriber's home UMTS/WLAN network via RADIUS or Diameter. The home AAA server processes the received message and performs an authentication procedure towards the mobile terminal. Subsequent AAA messages (e.g., for accounting during the session) follow the same path between the AAA client and the home AAA server, possibly via an AAA server in the WLAN network.

If a UMTS/WLAN subscriber roams into a WLAN network that has no association with the home network of the subscriber, then the subscriber is granted access only if the visited WLAN network has an association with a UMTS network that has a roaming agreement with the roaming subscriber's home UMTS network. This association may be a direct association or an indirect association via an AAA broker or proxy.

An example where the AAA communication between the visited WLAN access network and the home network of the subscriber must go through a visited UMTS network, (i.e., a UMTS network with which the home UMTS network of the subscriber has a roaming agreement), is illustrated in FIG. 2. More specifically, AAA messages sent from the AAA client to the AAA server of the visited WLAN network are then routed via the AAA server of an intermediary visited UMTS network (30 or 34) to the home AAA server 24 of the subscriber's home UMTS network 14.

A problem with this arrangement is that the AAA server 20 of the visited WLAN network 12 may have associations with multiple UMTS networks. Thus, the WLAN AAA server 20 does not know which of its associated UMTS networks has a roaming agreement with the home UMTS network 14 of the roaming subscriber. Even if the AAA server 20 of the visited WLAN network 12 did have this knowledge, the home UMTS network 14 of the subscriber may well have roaming agreements with more than one of the UMTS networks associated with the visited WLAN network 12. Because the choice of intermediary visited UMTS network is either impossible or arbitrary for the AAA server 20 of the visited WLAN network 12, the home service network 14 and/or the subscriber should be able to make the choice so that the most appropriate intermediary visited service network is selected. For example, in FIG. 2, intermediary service network 1 may be selected as the intermediary visited network, but intermediary service network 2 may be a better choice or simply the intermediary service network the subscriber prefers. In any event, intermediary service network 3 would not be chosen, because the home service network 14 does not have a roaming agreement with it.

There are several approaches to this problem. In two possible approaches, the WLAN network provides the mobile terminal with information about the service networks associated with the WLAN network. The mobile terminal then selects one of the associated service networks as its intermediary visited service network and indicates the selected network through information incorporated in an "extended NAI" or a "decorated NAI." The format of the decorated NAI could be, for example, home-realm/name@intermediary-visited-network-realm or home-realm!name@intermediary-visited-network-realm. The AAA server of the intermediary visited service network would interpret the decorated NAI, delete the intermediary-visited-network-realm part and move the home-realm part to its normal position after the @ character and delete the slash character or exclamation mark (thus turning the decorated NAI into a regular NAI) before forwarding the AAA message (in which the decorated NAI was included) to the AAA server of the subscriber's home network. Alternatively, the AAA server of the visited WLAN network could perform this operation before sending the AAA message to the AAA server of the intermediary visited service network.

The difference between the two approaches is how the information about associated networks is conveyed to the terminal, and to a certain extent, how the decorated NAI is transferred to the AAA server of the visited WLAN network. In the first approach, the Service Set Identifier (SSID) normally broadcast or "advertised" by the WLAN APs could be modified to contain information about associated UMTS network(s). The mobile terminal could then choose to access the WLAN access network or not, and if it chooses to access the WLAN access network, the mobile terminal can supply network selection information in the decorated NAI in the EAP-Identity Response message (responding to the initial EAP-Identity Request message from the WLAN network) during the authentication procedure.

But because the size of the SSID is limited, (no more than 30 octets of data), this approach relies on the concept of virtual APs to be implemented. With the virtual AP concept, a single physical AP can implement multiple virtual APs so that several WLAN hotspot providers can share the same infrastructure. In the context of network advertising, each associated UMTS network would be represented by its own virtual AP. Each virtual AP would send its own beacon frames advertising a unique SSID that identifies the corresponding UMTS network.

In the second approach, the information about associated UMTS networks could be included in an EAP-Identity Request message, (the EAP Identity Request message format is described in L. Blunk, et al., "PPP Extensible Authentication Protocol (EAP)", RFC 2284), from the WLAN network to the terminal. Specifically, the intermediary network information could be included after a NULL character in the Type-Data field in the EAP-Identity Request message. The EAP-Identity Request message may originate from the WLAN AP (in case it is the initial EAP-Identity Request message) or the AAA server of the visited WLAN network (in case it is a subsequent EAP-Identity Request message). In the former case, the AP includes this information in the initial EAP-Identity Request message provided that the AP, and not the access router, is the EAP authenticator. In the latter case, the AAA server of the visited WLAN network sends the information about associated UMTS networks to the terminal in a second EAP-Identity Request message only if the NAI received from the user/terminal in the response to the initial EAP-Identity Request message is not enough to route the AAA request to the home AAA server of the user. The mobile terminal could also explicitly request the AAA server of the visited WLAN network to send the network information in a second EAP-Identity Request message by providing a NAI with a dedicated request string (e.g., "Network-Info-Requested") in the name portion of the NAI in the first EAP-Identity Response message.

These approaches are terminal-based network selection methods in that the selection of the intermediary visited service network is based on criteria available in the terminal and/or manually input from the user. Available data that can be used for this purpose (besides manual user input) include, e.g., the following USIM files: User controlled PLMN selector with Access Technology (USIM file: $EF_{PLMNwAcT}$), which is a user defined PLMN priority list, Operator controlled PLMN selector with Access Technology (USIM file: $EF_{OPLMNwACT}$), which is an operator defined PLMN priority list, and the Forbidden PLMNs (USIM file: $EF_{FPLMN}$), which is a list of forbidden PLMNs in which roaming is not allowed (see 3 GPP TS 31.102 v6.2.0, "3rd Generation Partnership Project; Technical Specification Group Terminals; Characteristics of the USIM application (Release 6)".

A problem with the first approach, as identified earlier, is the limited space in the SSID field, which makes it necessary to use the virtual AP concept. Using the virtual AP concept for this purpose is problematic for several reasons. The fact that each virtual AP sends its own beacon frame increases signaling overhead (in terms of resources consumed by beacons) and has substantial scaling problems. Even a few virtual APs produce beacons that consume on the order of 10% of the total AP capacity. If numerous UMTS networks, e.g., UMTS networks associated with the WLAN network via a roaming consortium, were advertised, the beacons would consume the entire AP capacity. In addition, most deployed APs do not implement the virtual AP concept, and its presence in future APs is still uncertain. Thus, numerous installed APs would have to be upgraded. Another problem is that many deployed WLAN access networks may not be in a position to change their SSID.

The second approach is also problematic. In the variant where the network information is sent in the first EAP-Identity Request message, the behavior of the APs must be modified (which is particularly undesirable considering the number of deployed APs). In the other variant, a roundtrip delay between the terminal and the AAA server in the visited WLAN network is added to the overall access delay. In addition, since some EAP implementations already use the space beyond a NULL character in the Type-Data field of the EAP-Identity Request to convey various options, there is a potential risk for interference between intermediary UMTS network information transfer and existing use of the data space.

A general problem with all of these approaches is that they require the WLAN network to be knowledgeable about all the potential intermediary UMTS networks. This may not always be the case or even possible, e.g., when there is a roaming consortium between the WLAN network and one or several of the potential intermediary UMTS networks. Thus, schemes relying on network information advertised by the WLAN network may fail in some situations. An additional problem with these approaches is that they require EAPOL to be supported in the WLAN access network, which excludes, e.g., WLAN access networks that use web-based login procedures.

These problems also impact a larger AAA message routing context. FIG. 3 shows an example network that includes a mobile terminal (MT) and a WLAN that has known routes to two roaming consortiums (RCs) RC1 and RC3 and two UMTS networks UMTS 4 and UMTS 5. In a roaming consortium (RC), multiple networks subscribe to a common roaming agreement. If a WLAN network is a member of a roaming consortium RC1, it is likely that the WLAN network is not aware of the other members including RC2 and UMTSs 1-3 and 8-9. A WLAN network is likely not a member of more than one RC. Otherwise, its realm-based AAA routing would not work properly, since it would not know to which RC to send the AAA requests. Still, to provide a general picture, assume the WLAN in the example network of FIG. 3 is a member of RC1 and RC3.

Since the WLAN network does not know what networks that are beyond RC1, RC3, UMTS3, or UMTS5, only these networks RC1, RC3, UMTS3, and UMTS5 are reasonably advertised, e.g., by announcing them via SSIDs using the virtual AP concept with multiple beacons or by EAP-based advertising. But this advertising does not include all potential intermediary 3GPP networks with which the WLAN has a roaming agreement or association. Consequently, the advertisement does not permit selection of intermediary RCs or intermediary UMTSs beyond those advertised, which in this example include RC2 and UMTSs 1-3 and 8-9.

For example, when a user accesses a WLAN access network via the user's mobile terminal, the WLAN AAA server may not know which UMTS networks can be reached through the AAA infrastructure. Therefore, selecting and indicating only one intermediary UMTS network (or the home UMTS network) may not be the best routing strategy for the user. And if the WLAN network is not aware of, and therefore, does not advertise a UMTS network that the user could use as an intermediary UMTS network (or home UMTS network), the user or the user's mobile terminal either has to select an intermediary UMTS network at random or refrain from access. In the former case the end result may well be that access is denied, making both options unsatisfactory.

Indeed, there are several possible undesirable consequences of the WLAN not knowing about viable intermediary UMTS networks including suboptimal routes and unnecessary access denial. If there are multiple AAA paths to the home network, an AAA request may well be routed through a less preferred one. First, the AAA request may be routed via an intermediary UMTS network even though the home UMTS network is reachable via a RC. Assumedly, the AAA route via the RC is preferable to the AAA route via the intermediate UMTS network, since the UMTS-WLAN interworking architecture requires that the WLAN traffic is (normally suboptimally) routed via the visited intermediary UMTS network (according to scenario 3 of the 3GPP-WLAN interworking specification), which in turn means that the intermediary UMTS network normally will keep a part of the traffic charges. For instance, if UMTS 3 is the home network, the AAA request may be routed via UMTS 4 instead of via RC1. Second, the AAA request may be routed via a certain intermediary UMTS even though more preferable potential intermediary UMTSs were reachable via a RC. For instance, if UMTS 8 is the home UMTS, the AAA request may be routed via UMTS 5, even if UMTS 3 is a more preferable intermediary UMTS network. Third, the AAA access may be denied because no route could be found, either to the home network or to a potential intermediary UMTS, even though potential intermediary UMTSs were reachable via a RC. For instance, if the home network is UMTS 9, no AAA route would be found (and access would be denied), even though UMTS 2 could act as an intermediary UMTS.

Another problem associated with AAA routing involving intermediary network preferences is related to server-initiated messages, i.e., AAA requests initiated by the home AAA server and sent in the direction of the AAA client accessed by the mobile terminal. In most cases, the messages from the home AAA server (the "downlink direction") are sent in response to AAA messages originated from the AAA client (the "uplink direction"). In these cases, transaction information (a transaction includes a request-response message exchange) in the intermediary AAA server and the home AAA server ensures that the response message traverses the same AAA route or path (in the downlink direction) as the AAA client-initiated AAA request. However, in the case of home network-initiated AAA requests, no transaction information is present to guide the AAA message along the desired path downlink towards the AAA client The home AAA server can store the FQDN of the target AAA client as AAA session information (a session starts with an access request by the mobile and ends when the mobile disconnects from the network or explicitly deactivates communication or when the AAA server terminates the session (e.g. because the subscriber is out of funds in his pre-paid account)) and use it for routing server initiated AAA requests, but this FQDN does not provide any information about intermediary networks. Thus, there is no way to ensure that a home network server-initiated AAA request will traverse a desired intermediary network (assuming one is available). Instead, the server-initiated request will be routed according to the regular realm-based routing principles, i.e., based on the realm and/or FQDN of the target AAA client, which may result in another route or path that does not traverse the selected intermediary network(s) is used, or that no path at all is found.

In order to facilitate the realm-based routing of AAA requests and to ensure that a route to the home network can always be found, provided that one exists, a list of potential intermediary networks, preferably sorted in priority order, is, according to the present invention, included in the AAA request. AAA proxies (or relay agents) along the route can then use this list to find a reachable intermediary network in the list, even if the initial AAA server, the WLAN AAA server, had no knowledge of any of the networks in the list. Thus, the network list enables a form of "extra loose AAA source routing" that is flexible enough to handle also complex network scenarios. The term "extra loose AAA source routing" is meant to indicate a type of source routing where the indicated intermediary networks are merely potential, selectable intermediary networks and none of the indicated intermediary networks is mandatory to traverse. The prioritized list of potential intermediary networks can be made available to the initial AAA server, the WLAN AAA server, in different ways. Two such ways are described in commonly-assigned application Ser. No. 10/960,782, entitled, "Home Network-Assisted Selection Of Intermediary Network For A Roaming Mobile Terminal", and commonly-assigned application Ser. No. 10/960,780, entitled, "Terminal-Assisted Selection Of Intermediary Network For A Roaming Mobile Terminal". In the former commonly-assigned application, the WLAN AAA server retrieves the list from a central AAA server, which in part is in control by the home UMTS network operator. In the latter commonly-assigned application, the WLAN AAA server receives the list from the mobile terminal.

To ensure that server initiated AAA requests traverse the same selected mandatory intermediary network(s) as the client initiated AAA requests, the realm (in the form of a fully-qualified domain name (FQDN)) of each traversed mandatory intermediary network and the host identity (in the form of a FQDN) of the corresponding traversed intermediary AAA server are recorded in a client initiated AAA request and stored in the home AAA server. Subsequently, the home AAA server can include the stored information in server initiated AAA requests and route the requests via the mandatory intermediary network(s) using a sort of realm-based (and sometimes host identity based) loose source routing mechanism. In this case, the source routing mechanism is "loose" but not "extra loose" in the sense that the server-initiated AAA request must traverse the indicated intermediary network(s) on its way to the target AAA client, but it may also traverse one or more non-indicated intermediary network(s) (in addition to the indicated one(s)).

The present invention overcomes these problems using enhanced routing of an authentication, authorization, or accounting-related (AAA) message (related to a roaming mobile terminal) between a visited network and a home service network involving intermediary service network preferences. The term "mobile terminal" as used herein, for ease of description, encompasses mobile terminal equipment, the user or subscriber of the mobile terminal, the identity of a personal entity such as a SIM-card as well as the subscription currently associated with the mobile terminal. So, for example, authorization or authentication of the mobile terminal includes authorization or authentication of the user identity and authorization or authentication of the mobile terminal. The term "service network" encompasses any type of entity that can serve subscribers or facilitate serving of subscribers by participating in authentication, authorization and/or accounting signaling, e.g., a network serving its subscribers, an intermediary network, or a roaming consortium, e.g., in the form of a AAA server.

A list is stored of one or more intermediary service networks preferred for possible use in routing an AAA message between the mobile terminal and the home service network. The list is included with the AAA message and used to select one or more intermediary service networks. A selected intermediary service network conveys the AAA request message towards the home service network. The intermediary service networks are preferably listed by priority so that the intermediary service network with a highest priority on the list can be selected first. Each intermediary service network may be identified in the list using a domain name or a fully-qualified domain name (FQDN) of an AAA server of the intermediary service network. The list may be included, for example, as one or more AAA attributes in the AAA message, or in a network access identifier (NAI) associated with the mobile terminal that is included in the AAA message.

If the AAA message is a local access network (i.e., an AAA client)-originated AAA message, then the local access network currently being accessed by the mobile terminal stores the list for routing the AAA message in a first direction towards the home service network. If the local access network knows of a route for the AAA message to the home service network, the local access network routes the AAA message towards the home service network. Otherwise, the local access network includes the list in the AAA message and sends the AAA message on to one of the intermediary service networks on the list or to a default intermediary network.

Each intermediary service network that receives the AAA message with the list determines if a route for the AAA message to the home service network is known. If a route is known, the intermediary service network routes the AAA message towards the home service network. If a route is not known, the intermediary service network sends the AAA message on to one of the intermediary service networks on the list or to a default intermediary network.

If the AAA message is a home service network-originated AAA message, then the home service network stores the intermediary service network list for routing the AAA message in a second direction towards the local access network. In order to create the list, when the AAA client originates an AAA request message routed through a selected one or more preferred intermediary service networks, each selected intermediary service network adds to the AAA request message an associated identifier. Then when the home service network receives the AAA request message, the home service network generates the list using the associated identifier(s) included by the selected one or more intermediary networks. Thereafter, when the home network wants to originate an AAA message to the local access network, the home service network uses the generated list to route the home service network-originated AAA message towards the local access network using each of the intermediary service networks included on the generated list.

Each listed intermediary service network receiving the home service network-originated AAA message routes the home service network-originated AAA message to the next intermediary service network on the list or, if there are no more intermediary service networks on the list, directly to a local access network currently serving the mobile terminal. Each listed intermediary service network preferably removes its associated identifier from the list before routing the home service network-originated AAA message directly to that local access network or before routing the home service network-originated AAA message to the next intermediary service network on the list. In one example implementation, the associated identifier may include one or both of a domain name of the intermediary network or a domain name of an AAA server of the intermediary network.

DETAILED DESCRIPTION

The following description sets forth specific details, such as particular embodiments, procedures, techniques, etc. for purposes of explanation and not limitation. It will be appreciated by one skilled in the art that other embodiments may be employed apart from these specific details. For example, although the following description is facilitated using non-limiting WLAN/UMTS examples, the present invention may be employed in any local access/PLMN service network. In some instances, detailed descriptions of well-known methods, interfaces, circuits, and signaling are omitted so as not to obscure the description with unnecessary detail. Moreover, individual blocks are shown in the figures. Those skilled in the art will appreciate that the functions of those blocks may be implemented using individual hardware circuits, using software programs and data in conjunction with a suitably programmed digital microprocessor or general purpose computer, using application specific integrated circuitry (ASIC), and/or using one or more digital signal processors (DSPs).

Figure 1:
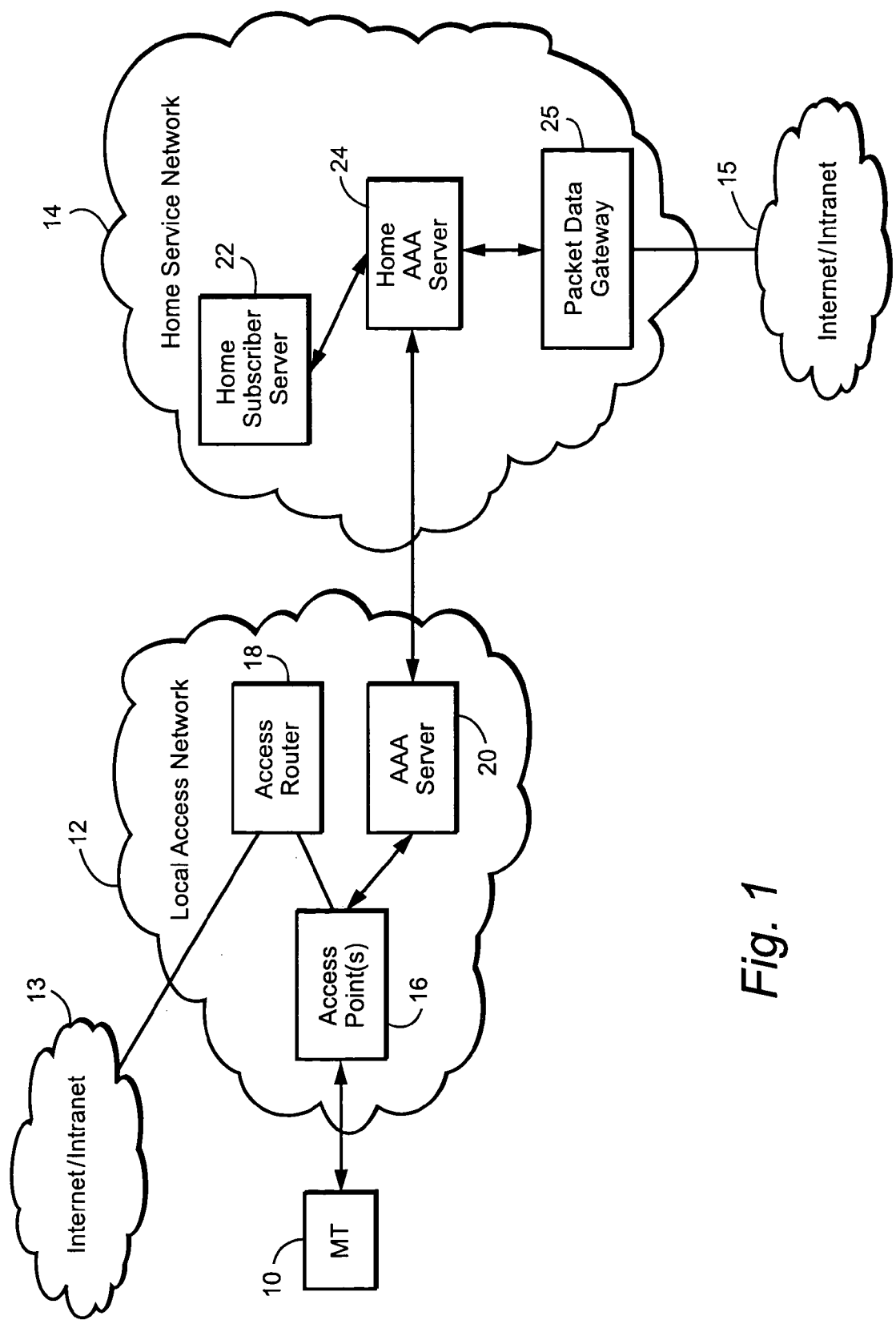
FIG. 1 is a diagram illustrating a system in which packet data services provided by a home service network can be accessed via a local access network.
Figure 2:
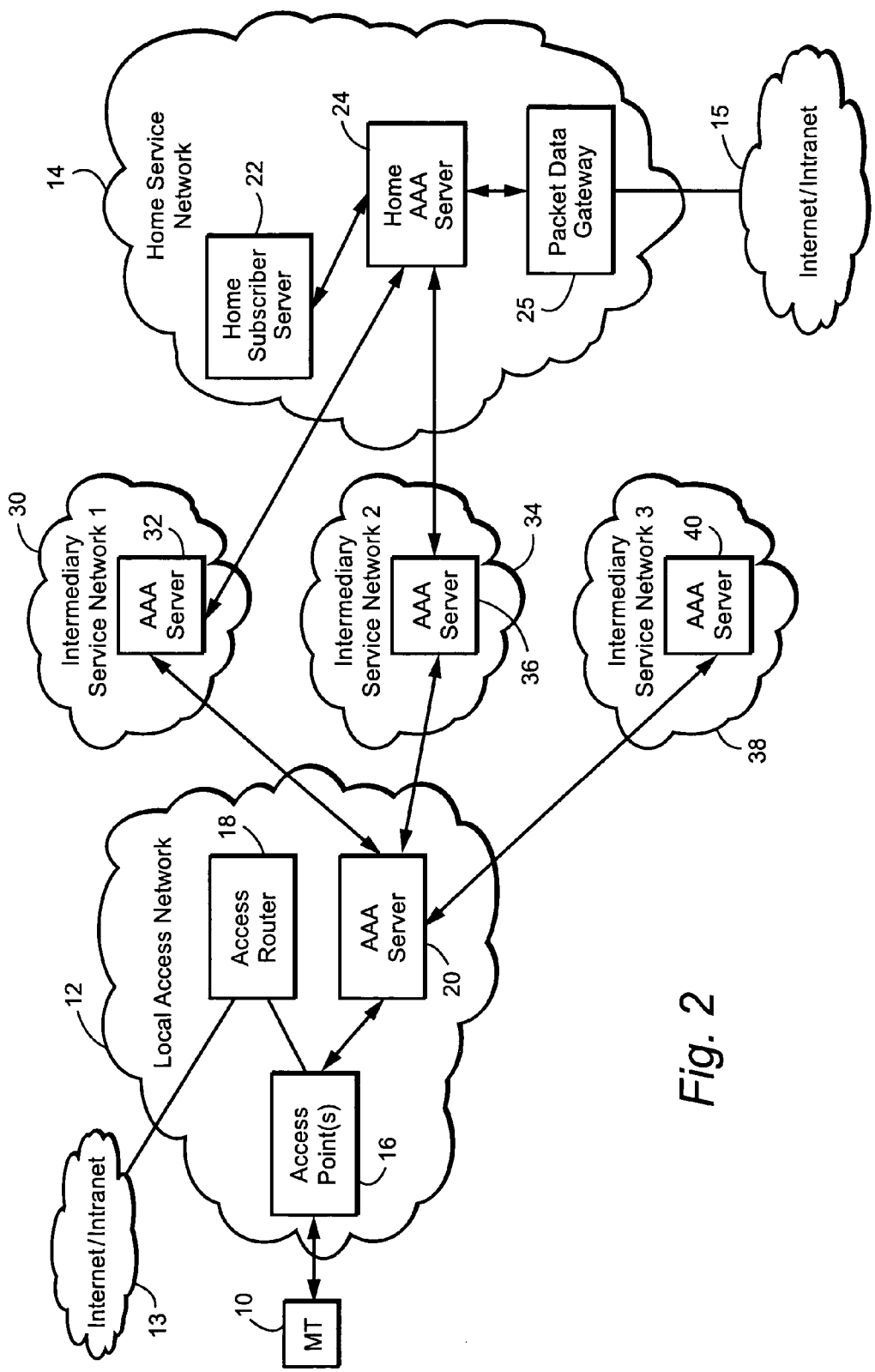
FIG. 2 illustrates indirect access to the home service network via the local access network and an intermediary service network.
Figure 3:
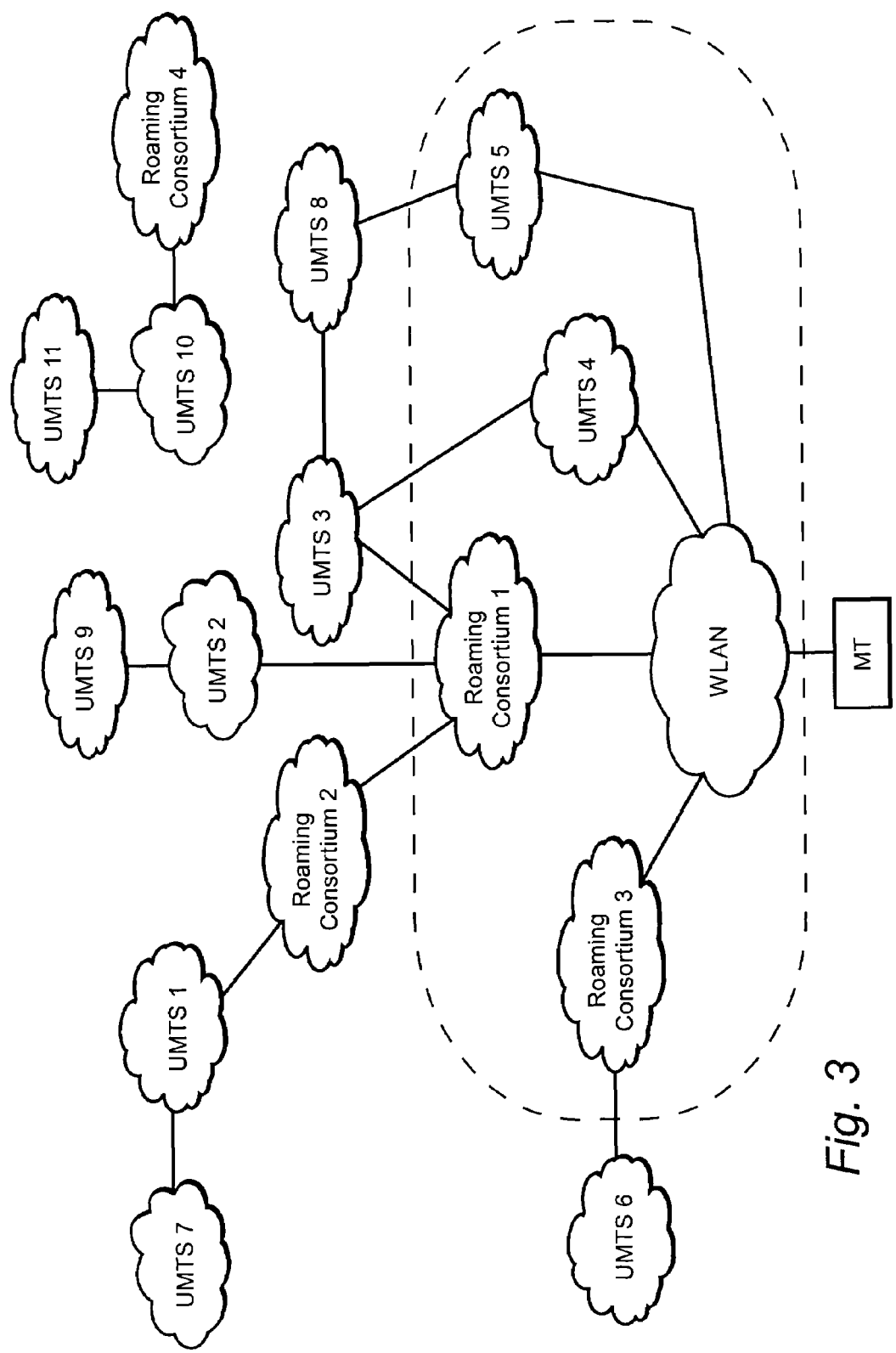
FIG. 3 is more expansive diagram used to explain the potential problems with routing AAA messages between the access network currently accessed by the mobile terminal and the home service network of the mobile terminal.
Figure 4:
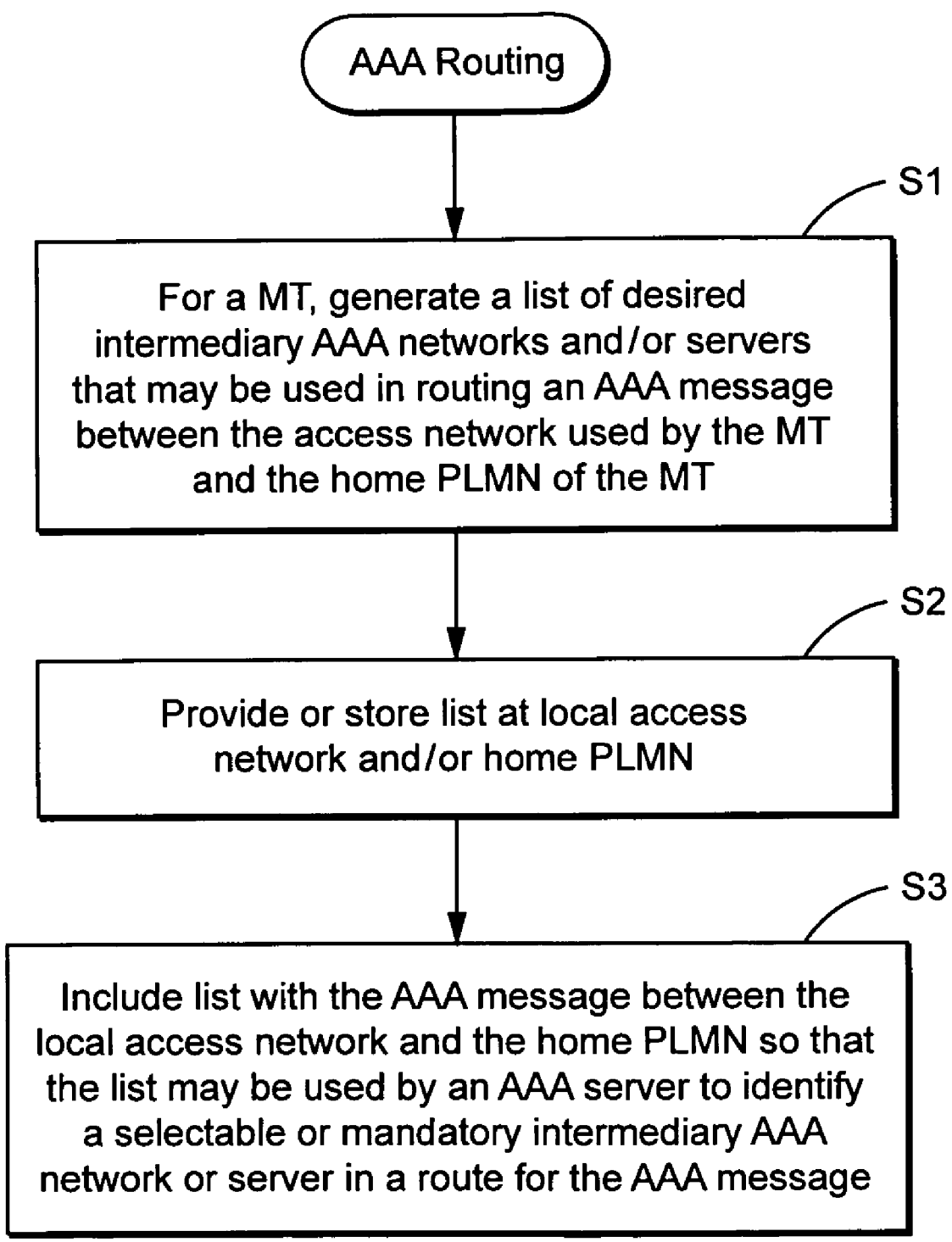
FIG. 4 is a flowchart diagram illustrating example procedures for enhanced AAA routing involving preferred intermediary networks.

FIG. 4 outlines in flowchart form example procedures for enhancing routing of an AAA message between a local access networks being accessed by a mobile terminal and the home network of the mobile terminal. First, a list is generated of desired or preferred potential intermediary PLMN network and/or AAA servers that may be selected for use in routing an AAA message or that are mandatory to traverse when routing an AAA message between the local access network being accessed by the mobile terminal and the home PLMN of the mobile terminal (step S1). That list is provided or stored at a local access network and/or home PLMN (step S2). The list is then included in the AAA message between the local access network and the home PLMN of the mobile terminal. That way, the list can be used by an AAA server to identify a selectable or mandatory intermediary PLMN network or AAA server in a route for the AAA message (step S3). These general procedures may be implemented in a variety of ways and in either or both routing directions including "uplink" from the mobile terminal to the home PLMN and "downlink" from the home PLMN to the mobile terminal.

Figure 5:
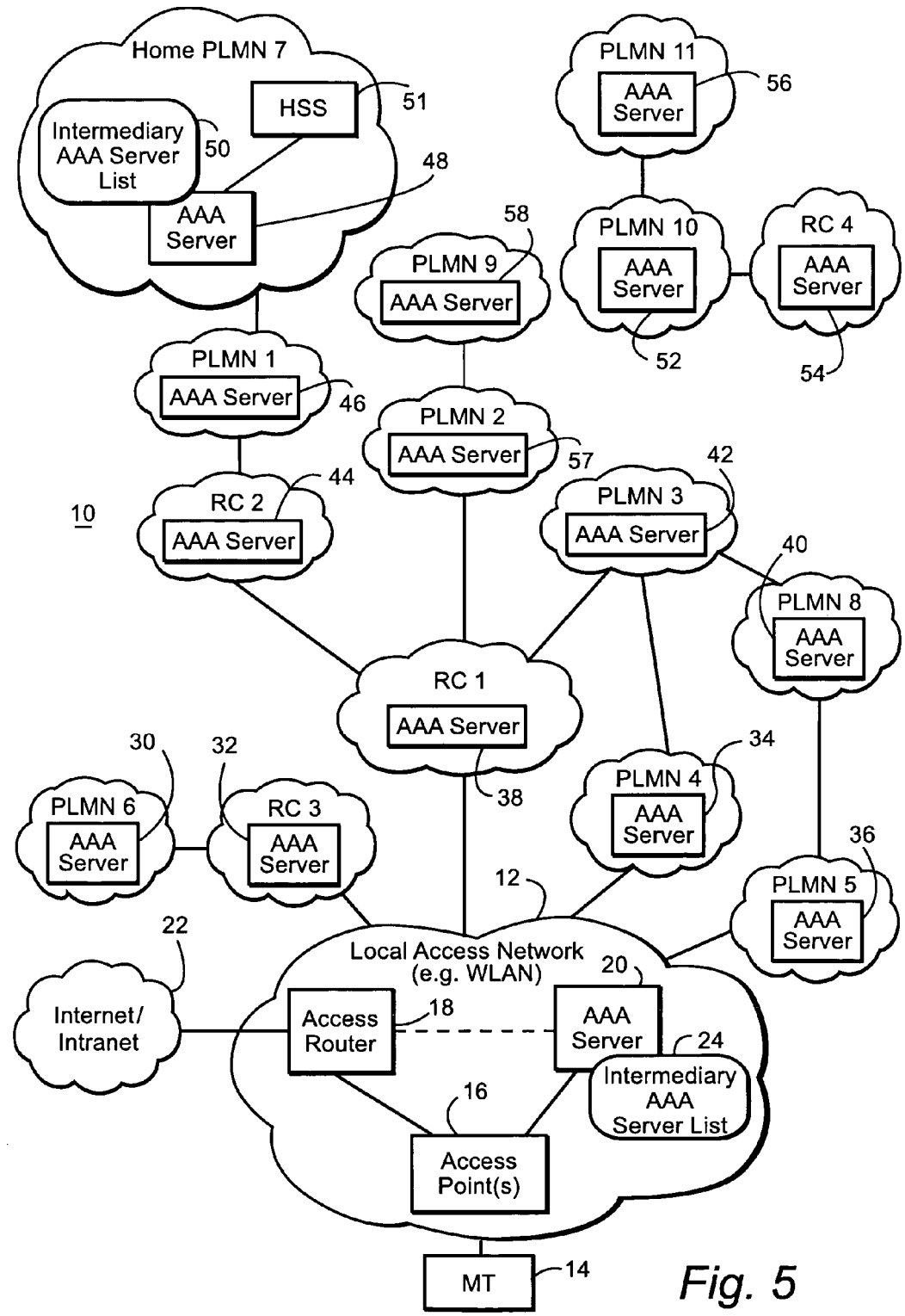
FIG. 5 is a diagram showing how a list of acceptable or preferred potential intermediary networks and/or servers can be used to enhance the routing of AAA messages between the access network currently accessed by the mobile terminal and the home PLMN of the mobile terminal.

FIG. 5 illustrates a non-limiting example system 10 in which two non-limiting, example applications are described. A mobile terminal (MT) 14 is in wireless communication with a local access network 12, one non-limiting example of which is a WLAN. The local access network 12 includes one or more access points 16 coupled to an AAA server 20 and an access router 18. The access router 18 is coupled to the Internet and/or an intranet represented together symbolically as cloud 22. In one example application, the AAA server 20 may have access to an intermediary visited service network select list 24 for this mobile terminal 14. That list may be generated by the local access network or provided by some other entity such as the mobile terminal (e.g., as described in commonly-assigned application Ser. No. 10/960,780, entitled, "Terminal-Assisted Selection Of Intermediary Network For A Roaming Mobile Terminal"), the home PLMN (e.g., as described in commonly-assigned application Ser. No. 10/960,782, entitled, "Home Network-Assisted Selection Of Intermediary Network For A Roaming Mobile Terminal"), manually input by the user, etc. In any event, the list is stored so that it is accessible by the AAA server 20, and preferably, can be updated as needed or desired.

The WLAN 12 is coupled to a roaming consortium 1 (RC1) that has an AAA server 38 as well as to a roaming consortium 3 (RC3) with its own AAA server 32. The WLAN 12 is also coupled to PLMN 4 having an AAA server 34 and PLMN 5 having an AAA server 36. Roaming consortium 3 is coupled to PLMN 6 which includes an AAA server 30. Roaming consortium 1 is coupled to roaming consortium 2 (RC2) that includes an AAA server 44, to PLMN2 that includes an AAA server 57, and to PLMN 3 that includes an AAA server 42. PLMN2 is coupled to PLMN9, which includes an AAA server 58. PLMN 3 is also coupled to PLMN 4 having an AAA server 34 as well as PLMN 8 having an AAA server 40. PLMN 8, which includes an AAA server 40, is coupled to both PLMN 3 and PLMN 5. RC2 is coupled to PLMN 1 which includes an AAA server 46. PLMN 1 is coupled to the home PLMN 7 for mobile terminal 14.

Home PLMN 7 includes an AAA server 48 coupled to a home subscriber server (HSS) 51. In another example application, an AAA server list 50 is accessible by the AAA server 48 and lists mandatory intermediary visited service network(s), which may be used for routing of AAA messages initiated by the home PLMN 7. The list may be created from data gathered by an AAA message traversing intermediate AAA servers on its path from the local access network to the home network. Also shown are PLMN 10 with AAA server 52 coupled to RC4 with AAA server 54 and PLMN 11 with AAA server 56. There is no routing path available from the local access network 12 to any of PLMN 10, PLMN 11, or RC4.

The first, non-limiting, example application relates to AAA type messages that must be routed in the uplink direction from the local access network (being accessed or otherwise serviced by the mobile terminal) to the home PLMN. The WLAN 12 may or may not advertise network information, either using an SSID based method or an EAP based method (as described above). The advertised network information need only include the directly connected networks and RCs. In FIG. 5, advertised network information includes PLMN 4, PLMN 5, RC1 and RC3. If the WLAN does advertise network information, then, if one of the advertised networks is the MT's/user's home network or if an advertised RC is one which the MT/user knows that the home network is a member of, then a regular NAI (i.e., name@home-realm) is all that is needed to find a route (without an intermediary PLMN) to the home PLMN.

If the advertised networks do not include the home PLMN or an RC of which the home PLMN is a member, but there is a PLMN that the mobile terminal can use as an intermediary PLMN, then the mobile terminal may construct a decorated NAI, e.g., of the format home-realm/name@intermediary-network-realm or home-realm!name@intermediary-network-realm, etc, to find a route to the home network via a specific intermediary PLMN. The mobile terminal may also supply a NAI including an intermediary PLMN list, as described in commonly-assigned application Ser. No. 10/960,780, entitled, "Terminal-Assisted Selection Of Intermediary Network For A Roaming Mobile Terminal", a regular NAI, if the home network controlled method described in commonly-assigned application Ser. No. 10/960,782, entitled, "Home Network-Assisted Selection Of Intermediary Network For A Roaming Mobile Terminal", or some other method to convey a PLMN selection list to the WLAN AAA server may be used. If decorated NAI routing is used and the WLAN AAA server 20 receives a decorated NAI from the MT/user, the WLAN AAA server can use this decorated NAI to route the AAA request to the home network via the intermediary network mandated by the decorated NAI.

The WLAN AAA server 20 receives or has access to a list of possible intermediary PLMNs, preferably ordered in order of priority/preference. If the WLAN AAA server 20 has a route to the home PLMN of the mobile terminal, an access request, e.g., an AAA request, can be routed to the home PLMN using the regular NAI. If the WLAN AAA 20 server does not have a route to the home PLMN of the mobile terminal, but has a direct association with one of the PLMNs in the list of possible intermediary PLMNs, it may select as intermediary PLMN that of the directly associated PLMNs in the list that has the highest priority and send the AAA request to the selected intermediary PLMN. In this case the WLAN AAA 20 server may optionally include the list of possible intermediary PLMNs in the AAA request (in a manner described below). If decorated NAI routing is supported and the WLAN AAA server 20 receives a decorated NAI from the mobile terminal, the AAA server 20 may use the decorated NAI to route the AAA request to the home PLMN via the mandated intermediary network indicated in the decorated NAI. In this case, the decorated NAI routing may fail if the WLAN AAA server 20 does not have a route to the indicated intermediary network, but instead sends the AAA request along a default route. If decorated NAI routing is supported and the WLAN AAA server has a route to one or more of the networks in the intermediary PLMN selection list, it may construct a decorated NAI including as the intermediary network-realm the realm of the highest priority PLMN on the list to which the AAA server 20 has a route. The WLAN AAA server 20 would then send the AAA request with the constructed decorated NAI included along the route towards the selected intermediary PLMN. However, the WLAN AAA server 20 may also use the more general method described below, even if it has a route to one or more of the networks in the list and even if a decorated NAI is received from the mobile terminal.

The WLAN AAA server and other intermediary AAA servers can use the intermediary PLMN AAA server selection list to aid AAA message routing in cases when no route to the home network is known and there is no directly associated network in the list. The WLAN AAA server 20 places the network list in an AAA attribute, e.g., called "Preferred-Intermediary-Networks", which is included in the AAA request. In RADIUS, where an attribute can be no longer than 255 octets, several Preferred-Intermediary-Networks attributes may have to be used to accommodate the complete list, but in Diameter, a single attribute should suffice. Alternatively, a single attribute may be used for each network in the list in both Diameter and RADIUS, with the order in which the attributes appear in a message signifying the relative priority/preference of the listed networks. The Preferred-Intermediary-Networks attribute is a new attribute, and therefore, represents an extension of either Diameter or RADIUS or both. Those skilled in the art will understand as well that this embodiment is not limited to Diameter or RADIUS and that any suitable AAA protocol may be employed.

The AAA request is sent to a default route preconfigured in the AAA server 20 unless the WLAN AAA server 20 has a route to one of the AAA servers in the list 24, in which case the AAA request is sent along the route towards that AAA server. In this example, the default route for AAA messages is to RC1. Subsequent intermediary AAA servers preferably look for a route to the home network and send the AAA request along this route if a route is found. Before sending the AAA message along a known route towards the home network, an intermediary AAA server may choose to remove the Preferred-Intermediary-Networks attribute(s) from the AAA message.

If no route to the home network is found, the intermediary AAA server checks the Preferred-Intermediary-Networks attribute(s) from the beginning of the list 24 (e.g., highest priority preferably listed first) to see if it can find a PLMN or RC AAA server on the list 24 to which it has a direct association or at least a known route. If one is found, the AAA request is routed towards that network/AAA server. If the selected network/AAA server is directly associated with the intermediary AAA server, the intermediary AAA server may choose to remove the Preferred-Intermediary-Networks attribute(s) from the AAA message before sending the message. If the selected intermediary network/AAA server is not directly associated with the AAA proxy and decorated NAI routing is supported, the intermediary AAA server may also construct a decorated NAI including the selected intermediary AAA server, substitute the decorated NAI for the regular NAI, and remove the Preferred-Intermediary-Networks attribute(s) from the AAA message.

Otherwise, if the selected intermediary AAA server has no route to any of the networks (neither the home network nor the networks in the list), then a default route is used, and the above process is repeated in the next AAA server in that default route. Finally, either the AAA request reaches the home PLMN AAA server or a "non-routable" indication can be returned (e.g., a Diameter answer message with the Result-Code AVP set to DIAMETER_UNABLE_TO_DELIVER).

In FIG. 5, the home network is PLMN 7. Accordingly, the WLAN AAA server 20 routes the AAA request associated with the mobile terminal to the default route, which is RC1.

The AAA server 38 in RC1 routes the AAA request to RC1's default route to the AAA server 44 in RC2. Assuming PLMN 1 is included in the list 24 (which it should be since PLMN 1 is coupled to PLMN 7), then AAA server 44 routes the AAA request to the AAA server 46 in PLMN 1. The AAA request is then routed to the AAA server 48 in the home network PLMN 7. If, on the other hand, PLMN 10 were the home network, then the request would be routed via RC1 to RC2 where a dead end is reached because there is no route to PLMN 10 or any of the networks in the list 24 (which in this example includes PLMN 11 and RC4). If the WLAN AAA server 20 receives a non-routable indication from RC1, it may attempt a second time by sending the AAA message to RC3.

This method may require that intermediary AAA servers in the route be modified to support the new attribute. The desired behavior of intermediary AAA servers that do not understand the new attribute is to ignore the new attribute and try to route the request towards the home network (as indicated in the NAI). One way to achieve this behavior in intermediary AAA servers using Diameter, e.g., Diameter relay or proxy agents, is to clear the 'M' bit in the AVP header indicating that the attribute is not mandatory. In RADIUS, the desired behavior can be achieved by making the attribute vendor specific (e.g., 3GPP specific). Another way to achieve the desired behavior in both Diameter and RADIUS is to include the network/AAA server list in the NAI instead of placing it in one or several AAA attributes. With this alternative approach, an intermediary AAA server that understands the list will use it, whereas one that does not understand it will just see a long NAI ending with "home-realm" and will route the request accordingly. But the limited size of the RADIUS attributes (and the even more limited accepted size of the NAI in certain RADIUS implementations) may make this alternative approach less useful if the AAA protocol is RADIUS. A benefit of this alternative scheme is that it can be used even if the WLAN AAA server 20 does not support the scheme, provided that some other AAA server along the default route does and provided that the list 24 is included in the NAI by the mobile terminal. The mobile terminal would then include the list 24 in the NAI, e.g., in a single EAP-Identity-Response, e.g., as described in commonly-assigned application Ser. No. 10/960,780, entitled, "Terminal-Assisted Selection Of Intermediary Network For A Roaming Mobile Terminal". The WLAN AAA server not supporting the network list scheme would then route the AAA message to the home network, if it has a route to the home network, and otherwise, it would route it along the default route (if it has one). The AAA message could be routed along a default route using only the regular realm-based routing mechanisms, but when an intermediary AAA server that supports the scheme and understands the network list receives the message, it would, if possible, make use of the scheme.

If the WLAN AAA server 20 does know the other members of a RC and at least one of these members is included in the list 24, but the WLAN AAA server 20 does not recognize the home network, then the WLAN AAA server 20 may construct a decorated NAI (provided that decorated NAI routing is supported) to ensure that the AAA request is routed to the selected intermediary PLMN network, even if the RC AAA servers do not support the Preferred-Intermediary-Networks attribute. For instance, if PLMN 9 were the home network and PLMN 2 is included in the network list, then the WLAN AAA server 20 (knowing that PLMN 2 is a member of RC1) can construct a decorated NAI, e.g. of the format PLMN 9/name@PLMN 2 or PLMN 9!name@PLMN 2, and send the AAA request to RC1.

A routing loop protection mechanism may also be used in where the list of possible intermediary networks is used to aid the AAA routing. An intermediary AAA server that finds its own realm in the list of possible intermediary networks in an AAA message removes its realm from the list before forwarding the message. This removal avoids a subsequent intermediary AAA server selecting from the list the realm of an AAA server that has already been traversed by the AAA message. This routing loop protection mechanism is however not needed, if the AAA protocol already has a built-in routing loop protection mechanism, which is the case in Diameter.

The enhanced AAA routing described above is not necessarily an alternative to decorated NAI routing. To the contrary, it may be complementary to decorated NAI routing (and network information advertisement). The mobile terminal may use advertised network information for WLAN network (AP) selection and may or may not use advertised network information for selection of an intermediary PLMN network. The decorated NAI routing can be used simultaneously/in parallel with AAA routing enhanced by the intermediary network list as described above. A decorated NAI can contain a network list and information from a network list can be used to construct a decorated NAI.

Figure 6:
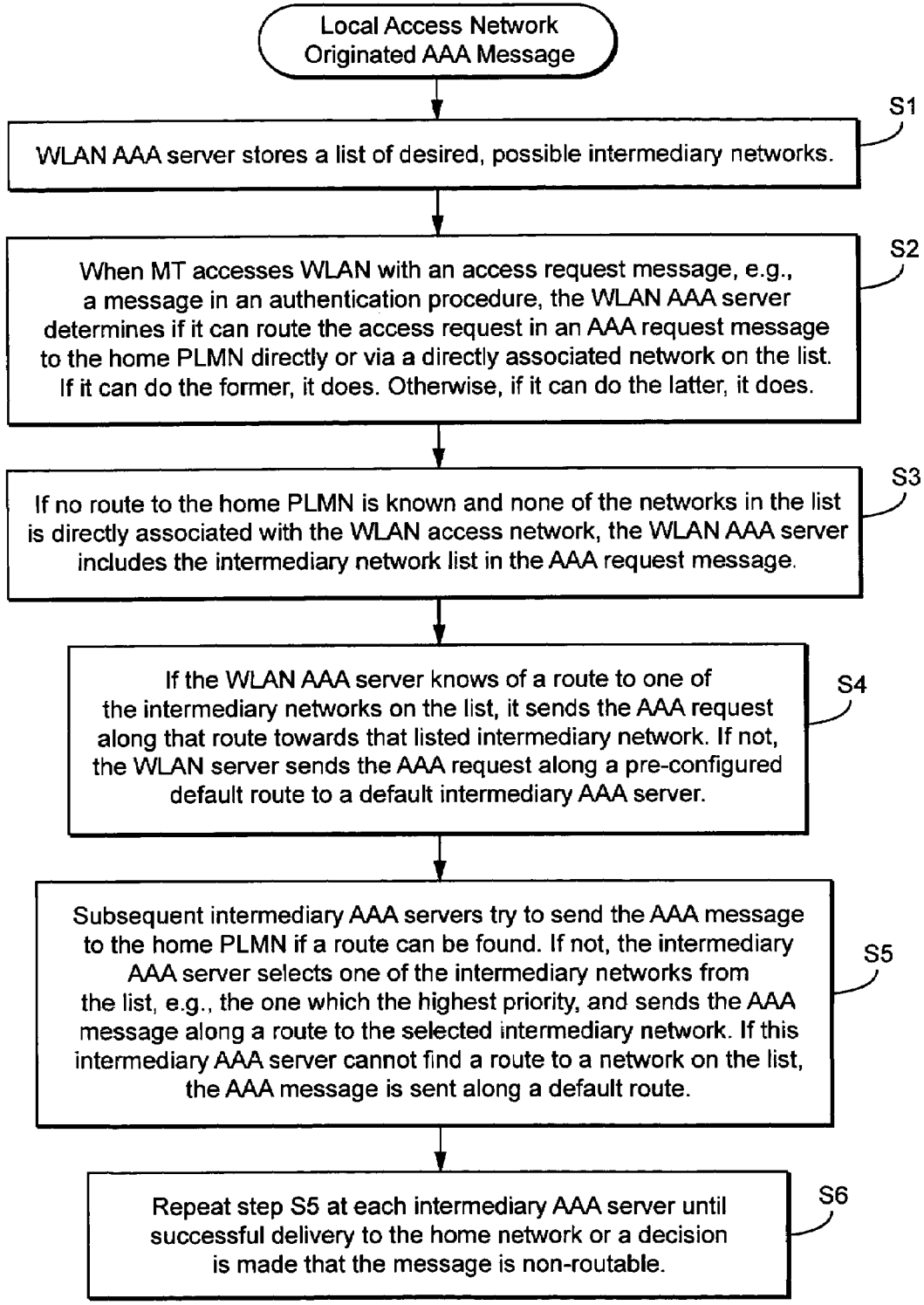
FIG. 6 is a flowchart diagram illustrating example procedures for enhanced AAA routing involving selection of one or more preferred intermediary networks for an AAA client-originated AAA message.

Reference is now made to the flowchart labeled local access network-originated AAA message in FIG. 6. Initially, the WLAN AAA server stores a list of preferred, possible intermediary networks or intermediary network AAA servers (step S1). When the mobile terminal accesses the WLAN with an access request message (which may be part of an authentication procedure, e.g., an EAP procedure), the WLAN AAA server determines if it can route the access request to the home PLMN AAA server directly or via one of the possible intermediary networks in the list with which the WLAN AAA server has a direct association. If the WLAN AAA server can route the access request directly to the home PMN AAA server, it does. Otherwise, if the WLAN AAA server has a direct association with one or more of the possible intermediary networks in the list, it selects the one of these directly associated possible intermediary networks that has the highest priority and sends the access request to that intermediary network. If no route to the home PLMN is known and none of the networks in the intermediary network list is directly associated with the WLAN AAA server, the WLAN AAA server includes the intermediary network list in the AAA request message (step S3). If the WLAN AAA server knows a route to one of the intermediary networks on the list, it sends the AAA request along that route towards that listed intermediary network AAA server. If not, the WLAN server sends the AAA request along a pre-configured default route to a default intermediary AAA server (step S4). Subsequent intermediary AAA servers try to send the AAA message to the home PLMN if a route can be found. If not, the intermediary AAA server selects one of the intermediary networks from the list, e.g., the one with the highest priority for which the intermediary AAA server has a route, and sends the AAA message along the route to that selected intermediary network. If this intermediary AAA server cannot find a route to a network on the list, the AAA message is sent along a default route (step S5). Step S5 is repeated at each intermediary AAA server until successful delivery of the AAA message to the home network or until a decision is made that the message is non-routable (step S6).

The above-described example application for enhancing the realm-based AAA routing with intermediary network preferences is directed to AAA requests sent in the uplink direction from the access network to the home network (and the home AAA server). The AAA request is routed through a particular intermediary network (or particular intermediary networks), and the transaction state (i.e., the AAA message path or route) stored in intermediary AAA servers (proxies, Diameter relay agents, etc.) ensures that an AAA answer message from the home AAA server 48 follows the reverse path. In other words, any AAA answer message will traverse the same intermediary network(s) as the AAA request message that triggered the AAA answer message (but in the reverse order and direction). A second non-limiting and example application may be used to ensure that AAA server-initiated AAA requests (i.e., unsolicited AAA requests sent from the home AAA server or from an intermediary AAA server) traverse a path via one or more selected intermediary network(s). The same is true for a decorated NAI routing scheme. Normally, such server-initiated AAA requests will be routed according to regular realm-based routing principles (based on the realm and/or FQDN of the target AAA client), which may result in another path not traversing selected or otherwise desirable intermediary network(s) is used or that no path at all is found.

In order to make a home server-initiated AAA request traverse the same selected intermediary network(s) as an AAA request from the local access network would, information defining the AAA route, i.e., the intermediary network(s), has to be conveyed to and stored in the home AAA server or conveyed to and stored in each intermediary AAA server or both. One solution is to store this type of information in all intermediary AAA servers. But that would mean storing state information with a longer life-time than transaction state information, e.g., session state information. In this context, a transaction is a single exchange of AAA messages, one in each direction (uplink and downlink), i.e., an AAA request message and an AAA answer message. This can be undesirable in some situations, e.g., for a Diameter relay agent, which normally stores only transaction state information. Another more attractive solution is to convey the AAA route information to the home AAA server and store it there as session state information. Session state information corresponds to information that is valid for the duration of a session which ends when the mobile terminal disconnects or ends the session or when the home AAA server ends the session and can include multiple uplink and downlink exchanges.

One way of implementing this latter solution is to insert the required information about each selected intermediary network in two AAA attributes, e.g., called "Traversed-Mandatory-Intermediary-Realm" and "Traversed-Host-Of-Mandatory-Intermediary-Realm", as the initial AAA request is sent from the local access network to the home AAA server. The enhanced AAA routing mechanism for AAA server-initiated messages, and the way it uses the AAA attributes, is first described for the case when there is only a single explicitly selected intermediary service network and then generalized to the general case where there may be multiple explicitly selected intermediary service networks. When the AAA request traverses an explicitly selected intermediary service network, the AAA server of the intermediary network inserts its realm (in the form of a FQDN) in the Traversed-Mandatory-Intermediary-Realm attribute and its own host identity (in the form of a FQDN) in the Traversed-Host-Of-Mandatory-Intermediary-Realm attribute and adds both attributes to the AAA request message.

The expression "explicitly selected" refers to a selection of an intermediary service network that will have a certain role in the AAA communication, e.g., the role of a visited UMTS network or some other role that means that policies are applied or accounting data is monitored etc., and that may store session state and that consequently may use (and even need) information (other than the purely AAA routing related information) included in server-initiated AAA messages. An AAA server of an intermediary service network may itself determine whether it needs to be traversed by server-initiated AAA messages. The explicitly selected intermediary service network(s) may be all or a subset of all the intermediary service networks between the local access network and the home service network. For example, an explicitly selected intermediary service network may have been selected from a list of possible intermediary networks (as described above) or may have been indicated in a decorated NAI. The purpose of this example application is to ensure that server-initiated AAA messages traverse the explicitly selected intermediary service network(s) (although in the reverse order and direction as the AAA client-initiated AAA messages). That is, although the explicitly selected intermediary service network(s) may have been selectable when routing an AAA client-initiated AAA message in the uplink direction, once selected, the explicitly selected intermediary service network(s) is (are) mandatory for subsequent server-initiated AAA messages in the downlink direction. Consequently, the explicitly selected intermediary service network(s) may in the context of this example application be referred to as mandatory intermediary service network(s) for server-initiated AAA messages.

When the home AAA server receives the AAA request it stores the contents of the Traversed-Mandatory-Intermediary-Realm attribute and the Traversed-Host-Of-Mandatory-Intermediary-Realm attribute. Thereafter, when sending downlink server-initiated AAA requests, the home AAA server can use the stored information for realm-based (and sometimes host identity-based) loose source routing. That is, routing information about the mandatory intermediary network is included in the server-initiated AAA request message to ensure the request is routed through the mandatory intermediary network. For some server-initiated AAA messages, it may not matter which intermediary AAA server, out of a group of AAA servers serving the realm of a selected intermediary network, that the message traverses. In that case, the home AAA server includes in the server-initiated AAA message the realm (in the form of a FQDN) of the desired intermediary network, e.g., in an attribute called "Intermediary-Realm."

For other server-initiated AAA messages, it may be important that the same intermediary AAA server (out of a possible group of AAA servers serving the same realm of a selected intermediary network) that was traversed by an initial client-initiated AAA request also be traversed by the server-initiated message. An example of such a message is the Diameter Abort-Session-Request message. In such a message the home AAA server includes, in addition to the realm of the mandatory intermediary network, the host identity (in the form of a FQDN) of the particular intermediary AAA server to be traversed, e.g. in an attribute called "Intermediary-Host." The home AAA server and possible intermediary AAA servers, e.g., proxies and/or relay agents, would route the server-initiated AAA request towards the selected intermediary network based on the Intermediary-Realm attribute or, if present, the Intermediary-Host attribute. When the intermediary AAA server receives the server-initiated AAA request, it removes the Intermediary-Realm attribute and, if present, the Intermediary-Host attribute before forwarding the request. Subsequently, in the absence of Intermediary-Realm and Intermediary-Host attributes, the server-initiated AAA request is routed to the local access network using regular realm-based routing principles, i.e., based on the realm and/or FQDN of the target AAA client.

This way of controlling a server-initiated AAA request to traverse one intermediary network also applies to multiple, previously-selected (mandatory) intermediary networks. When the initial AAA request is routed uplink from the local access network to the home AAA server, the AAA server of each explicitly selected intermediary network adds a Traversed-Mandatory-Intermediary-Realm attribute (containing the realm it is serving in the form of a FQDN) and a Traversed-Host-Of-Mandatory-Intermediary-Realm attribute (containing its own host identity in the form of a FQDN) to the AAA request. Each Traversed-Mandatory-Intermediary-Realm attribute is added in a way that the relative order in which the attributes appear in the AAA message signifies the order in which the mandatory intermediary networks were traversed by the AAA request. Each Traversed-Host-Of-Mandatory-Intermediary-Realm attribute is added in the same order so that the order in which the corresponding intermediary AAA servers were traversed can be identified. Furthermore, this ordered way of adding the attributes makes it possible to match each Traversed-Host-Of-Mandatory-Intermediary-Realm attribute with its corresponding Traversed-Mandatory-Intermediary-Realm attribute.

Of course, other attribute structures (and attribute names) for storing the information about selected intermediary networks may be used, and those examples provided above, are simply illustrative. In Diameter, the realm and host identity of each intermediary AAA server (serving the realm of a selected intermediary network) may, for instance, be included together in a grouped AVP (i.e., resulting in one grouped AVP for each mandatory intermediary network). Another non-limiting example is to have a grouped AVP for all the selected intermediary realms and another grouped AVP for all the corresponding intermediary host identities. A third non-limiting example is to include all realms and all host identities in a single grouped AVP. The type of AVP structure is not essential as long as an AAA server receiving the message can identify the relative order among the included realms and host identities as well as match each host identity with its corresponding realm.

The home AAA server stores the contents of all the Traversed-Mandatory-Intermediary-Realm and Traversed-Host-Of-Mandatory-Intermediary-Realm attributes. When subsequently sending a server-initiated AAA request, the home AAA server includes one Intermediary-Realm attribute for each Traversed-Mandatory-Intermediary-Realm attribute that it previously received and if required, one Intermediary-Host attribute for each Traversed-Host-Of-Mandatory-Intermediary-Realm attribute that it previously received. The Intermediary-Realm attributes and, if present, Intermediary-Host attributes are included in the server-initiated AAA message in a way that their relative order signifies the order in which the selected networks should be traversed. The AAA server of each traversed mandatory intermediary network then removes the Intermediary-Realm attribute containing its own realm and, if present, the Intermediary-Host attribute containing its own host identity before forwarding the server-initiated AAA request. When all Intermediary-Realm and Intermediary-Host attributes are removed, the server-initiated AAA request is routed to the local access network using the regular realm-based routing principles, i.e., based on the realm and/or FQDN of the target AAA client.

Of course, other attribute structures (and attribute names) for storing the information about mandatory intermediary networks in a server-initiated AAA message may be used, and those examples provided above, are simply illustrative. For instance, in Diameter various variants of grouped AVPs can be used to convey the information. The realm and host identity of each intermediary AAA server (serving the realm of a selected intermediary network) may, for instance, be included together in a grouped AVP (i.e., resulting in one grouped AVP for each mandatory intermediary network). Another non-limiting example is to include all realms and all host identities in a single grouped AVP. In a grouped AVP, an omitted host identity (i.e., when there is a realm without a matching host identity) may be indicated e.g., by a dedicated value or a zero-length sub-AVP for the host identity.

It should be noted that this method for forcing server initiated AAA requests to traverse one or more mandatory intermediary network(s) is independent of the uplink AAA routing scheme. It can be used together with the uplink AAA routing scheme described above, with decorated NAI routing, or with any other scheme for selecting one or more intermediary network(s) and forcing the AAA client-initiated traffic to traverse the selected intermediary network(s).

Figure 7:
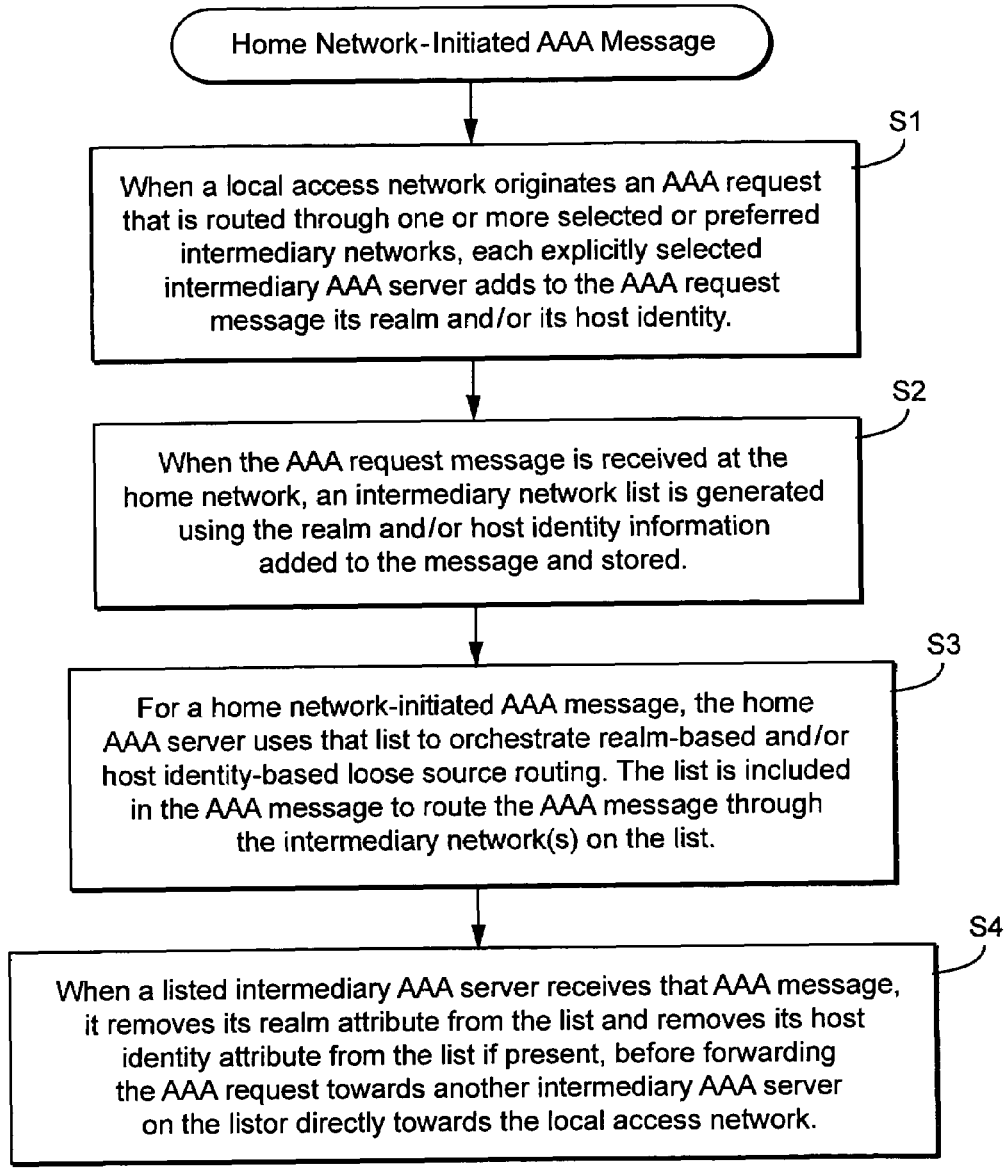
FIG. 7 is a flowchart diagram illustrating example procedures for enhanced AAA routing for a home network-initiated AAA message.

Reference is now made to the flow chart diagram in FIG. 7 labeled home network-initiated AAA message which illustrates example steps useful in implementing the second example application. When a local access network originates an AAA request that is routed through one or more explicitly selected or preferred intermediary networks, each AAA server in a selected intermediary network adds to the AAA request message its realm and/or its host identity (step S1). When the AAA message is received at the home network, an intermediary network list is generated using the realm and/or host identity information added to the AAA message, and the list is stored (step S2). For a home network-initiated AAA message, the home AAA server uses that list to orchestrate realm-based and/or host identity-based loose source routing. The list is included in the AAA message to route the AAA message through the intermediary network(s) on the list (step S3). When a listed intermediary AAA server receives that AAA message, it removes its realm attribute from the list and removes its host identity attribute from the list if present, before forwarding the AAA request towards another intermediary AAA server on the list or directly towards the local access network which is currently serving the mobile terminal (step S4).

There are many advantages of the invention, some of which are now described. A route to the home network, possibly via an intermediary network, can always be found (if there is one), even when no or incomplete network information is advertised by the WLAN network. Network access is not unnecessarily denied. A PLMN network that is not directly associated with the WLAN network, e.g., one that is "hidden" behind a RC, can be used as an intermediary PLMN network via one or several RCs. The WLAN network does not have to advertise network information (although it may still be advantageous to do so). Server-initiated AAA requests can be forced to traverse the same selected intermediary networks as AAA requests sent from the access network to the home network.

While the invention has been described in connection with example embodiments, it is to be understood that the invention is not to be limited to any particular embodiment. On the contrary, the invention is intended to cover various modifications and equivalent arrangements included within the scope of the appended claims.

The invention claimed is:

1. A method for enhancing routing of an authentication, authorization, or accounting-related (AAA) message associated with a roaming mobile terminal to a home service network, comprising:
   storing in a local access network associated with the mobile terminal, a list of one or more intermediary service networks preferred for possible use in routing the AAA message from the local access network towards the home service network;
   the local access network including the list with the AAA message;
   at least one of the local access network and one or more subsequent intermediary service networks selecting from the list an intermediary service network; and
   the local access network or the one or more subsequent intermediary service networks using the selected intermediary service network to convey the AAA message towards the home service network.

2. The method in claim 1, wherein the listed intermediary service networks are listed by priority, the method further comprising:
   the local access network or the one or more subsequent intermediary service networks selecting the intermediary service network with a highest priority on the list for which a route is known.

3. The method in claim 1, wherein each intermediary service network is identified in the list using a domain name or a fully-qualified domain name of an AAA server of the intermediary service network.

4. The method in claim 1, wherein the list is included as one or more AAA attributes in the AAA message.

5. The method in claim 1, wherein the list is included in a network access identifier (NAI) associated with the mobile terminal that is included in the AAA message.

6. The method in claim 1, further comprising:
   determining if the local access network knows of a route for the AAA message to the home service network;
   if a route is known, the local access network routes the AAA message towards the home service network;
   if a route is not known, determining if the local access network knows of a route for the AAA message to an intermediary service network on the list;
   if a route is known, the local access network routes the AAA message towards the intermediary service network and, unless the local access network is directly associated with the intermediary service network, includes the list in the AAA message;
   if a route is not known, the local access network sends the AAA message to a default intermediary service network.

7. The method in claim 1, wherein each intermediary service network that receives the AAA message with the list performs the following steps:
   determines if a route for the AAA message to the home service network is known;
   if a route is known, the intermediary service network routes the AAA message towards the home service network;
   if a route is not known, the intermediary service network sends the AAA message on to one of the intermediary service networks on the list or to a default intermediary service network.

8. Apparatus for enhancing routing of an authentication, authorization, or accounting-related (AAA) message associated with a roaming mobile terminal towards a home service network, comprising:
   a memory for storing a list of one or more intermediary service networks preferred for possible use in routing the AAA message towards the home service network, and
   data processing circuitry for performing the following tasks:
      including the list with the AAA message;
      using the list to select an intermediary service network; and
      using the selected intermediary service network to convey the AAA request message towards the home service network.

9. The apparatus in claim 8, wherein the listed intermediary service networks are listed by priority, and the data processing circuitry is further configured to select the intermediary service network with a highest priority on the list for which a route is known.

10. The apparatus in claim 8, wherein each intermediary service network is identified in the list using a domain name or a fully-qualified domain name of an AAA server of the intermediary service network.

11. The apparatus in claim 8, wherein the list is included as one or more AAA attributes in the AAA message.

12. The apparatus in claim 8, wherein the list is included in a network access identifier (NAI) associated with the mobile terminal that is included in the AAA message.

13. The apparatus in claim 8, wherein the data processing circuitry is in a local access network node which is configured to store the list for routing the AAA message towards the home service network.

14. The apparatus in claim 8, wherein the data processing circuitry is further configured to:
   determine a known route for the AAA message to the home service network;
   if a known route is determined, control routing of the AAA message towards the home service network;
   if a known route is not known, include the list in the AAA message, unless a direct association with an intermediary service network on the list exists, and cause sending of the AAA message on to one of the intermediary service networks on the list or to a default intermediary service network.

15. A system comprising the apparatus in claim 8 implemented in a local access network associated with the mobile terminal and one or more intermediary service networks, wherein each intermediary service network that receives the AAA message with the list includes data processing circuitry configured to perform the following:
   determine if a route for the AAA message to the home service network is known;
   if a route is known, control routing of the AAA message towards the home service network;
   if a route is not known, control sending of the AAA message on towards one of the intermediary service networks on the list or to a default intermediary network.

16. Apparatus in a local access network for enhancing routing of an authentication, authorization, or accounting-related (AAA) message associated with a roaming mobile terminal towards a home service network, comprising:
   means for storing a list of one or more intermediary service networks preferred for possible use in routing the AAA message towards the home service network; and
   means for including the list with the AAA message;
   means for selecting from the list an intermediary service network; and means for using the selected intermediary service network to convey the AAA message towards the home service network.

17. The apparatus in claim 16, wherein the listed intermediary service networks are listed by priority, and the means for selecting is configured to select the intermediary service network with a highest priority on the list for which a route is known.

18. The apparatus in claim 16, wherein each intermediary service network is identified in the list using a domain name or a fully-qualified domain name of an AAA server of the intermediary service network.

19. The apparatus in claim 16, wherein the list is included as one or more AAA attributes in the AAA message.

20. The apparatus in claim 16, wherein the list is included in a network access identifier (NAI) associated with the mobile terminal that is included in the AAA message.

21. The apparatus in claim 16, further comprising:

means for determining if the local access network knows of a route for the AAA message to the home service network;

if a route is known, means for routing the AAA message towards the home service network;

if a route is not known, means for including the list in the AAA message, unless a direct association with an intermediary service network on the list exists, and sending the AAA message on to one of the intermediary service networks on the list or to a default intermediary service network.

* * * * *

UNITED STATES PATENT AND TRADEMARK OFFICE
CERTIFICATE OF CORRECTION

PATENT NO.        : 7,590,732 B2                                       Page 1 of 1
APPLICATION NO.   : 10/960783
DATED             : September 15, 2009
INVENTOR(S)       : Rune It is certified that error appears in the above-identified patent and that said Letters Patent is hereby corrected as shown below:

In Column 6, Line 65, delete "client" and insert -- client. --, therefor.

In Column 14, Line 35, delete "PMN" and insert -- PLMN --, therefor.

Signed and Sealed this

Twelfth Day of January, 2010

David J. Kappos
*Director of the United States Patent and Trademark Office*